(12) United States Patent
Nakagawa et al.

(10) Patent No.: US 9,085,739 B2
(45) Date of Patent: Jul. 21, 2015

(54) METHOD FOR GAS TREATMENT OF COAL

(75) Inventors: Keiichi Nakagawa, Tokyo (JP); Setsuo Omoto, Tokyo (JP); Keiji Tanizaki, Tokyo (JP); Junji Asahara, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 240 days.

(21) Appl. No.: 13/996,833

(22) PCT Filed: Dec. 8, 2011

(86) PCT No.: PCT/JP2011/078413
§ 371 (c)(1),
(2), (4) Date: Sep. 5, 2013

(87) PCT Pub. No.: WO2012/086422
PCT Pub. Date: Jun. 28, 2012

(65) Prior Publication Data
US 2013/0333280 A1    Dec. 19, 2013

(30) Foreign Application Priority Data

Dec. 22, 2010    (JP) ................................. 2010-285504

(51) Int. Cl.
*F26B 21/12* (2006.01)
*C10L 5/04* (2006.01)
(Continued)

(52) U.S. Cl.
CPC . *C10L 5/04* (2013.01); *C10B 49/04* (2013.01); *C10B 57/10* (2013.01); *C10L 5/447* (2013.01);
(Continued)

(58) Field of Classification Search
CPC .......... F26B 19/00; F26B 21/00; F26B 21/12; C10L 5/00; C10L 5/04; C10L 9/00; C10L 9/08; C10G 1/66; C10G 5/00; C10G 31/00

USPC ........... 34/333, 354, 359; 44/581, 626; 201/4, 201/6; 423/46
See application file for complete search history.

(56) References Cited

U.S. PATENT DOCUMENTS 3,607,224 A * 9/1971 Blaskowski .................... 75/453
3,793,743 A * 2/1974 Kemmetmueller ............. 34/578
(Continued)

FOREIGN PATENT DOCUMENTS

CN    201637228 U    11/2010
EP    1178149 A1 *    2/2002 .......... D06M 15/263
(Continued)

OTHER PUBLICATIONS

Chinese Office Action dated Dec. 19, 2013, issued in corresponding Chinese Application No. 201180060943.8 with English Translation. (12 pages).
(Continued)

*Primary Examiner* — Steve M Gravini
(74) *Attorney, Agent, or Firm* — Westerman, Hattori, Daniels & Adrian, LLP

(57) ABSTRACT

In a method for gas treatment of coal wherein coal (1, 2) is loaded on a moving mesh conveyor (111, 112) having a quadrilateral mesh and heated gas (11, 12) is circulated from above and below so as to bring the heated gas (11, 12) into contact with the coal (1, 2) via the mesh of the mesh conveyor (111, 112), two layers of coal for lower level stacking (1A, 2A) having a diameter (Dl) that is greater than twice the length (Lss) of the short side of the mesh of the mesh conveyor (111, 112) are loaded on the mesh of the mesh conveyor (111, 112) and coal for upper level stacking (1B, 2B) having a diameter (Du) that is twice said length (Lss) or less is loaded on the coal for lower level stacking (1A, 2A).

7 Claims, 1 Drawing Sheet

(51) Int. Cl.
*C10B 49/04* (2006.01)
*C10B 57/10* (2006.01)
*C10L 5/44* (2006.01)
*C10L 9/08* (2006.01)
*F23K 1/04* (2006.01)
*F26B 17/04* (2006.01)

(52) U.S. Cl.
CPC ... *C10L 9/08* (2013.01); *F23K 1/04* (2013.01); *F26B 17/04* (2013.01); *F23K 2201/20* (2013.01); *F23K 2203/20* (2013.01); *Y02E 50/10* (2013.01); *Y02E 50/30* (2013.01)

(56) References Cited

U.S. PATENT DOCUMENTS

| | | | | |
|---|---|---|---|---|
| 3,800,427 | A | * | 4/1974 | Kemmetmueller ............. 34/363 |
| 3,988,236 | A | * | 10/1976 | Albright et al. ............... 208/408 |
| 4,452,670 | A | * | 6/1984 | Kovacic et al. ................... 201/6 |
| 4,606,138 | A | * | 8/1986 | Gentry ............................ 34/182 |
| 5,361,513 | A | * | 11/1994 | Woessner ........................ 34/363 |
| 6,846,518 | B2 | * | 1/2005 | Katoh et al. ................... 427/337 |
| 7,574,816 | B2 | * | 8/2009 | Shivvers ......................... 34/333 |
| 8,309,052 | B2 | * | 11/2012 | Jones ............................. 423/460 |
| 2009/0300940 | A1 | * | 12/2009 | Bonner et al. ................... 34/505 |
| 2011/0078917 | A1 | * | 4/2011 | Bland et al. ...................... 34/354 |
| 2011/0247233 | A1 | * | 10/2011 | Bland et al. ...................... 34/333 |
| 2013/0333280 | A1 | * | 12/2013 | Nakagawa et al. ............. 44/626 |

FOREIGN PATENT DOCUMENTS

| | | | |
|---|---|---|---|
| JP | 57-195799 | A | 12/1982 |
| JP | 59-107115 | A | 6/1984 |
| JP | 5-87496 | U | 11/1993 |
| JP | 2001-200269 | A | 7/2001 |
| JP | 2011-37938 | A | 2/2011 |
| WO | WO 0055418 | A1 * | 9/2000 |
| WO | 2011/016371 | A1 | 2/2011 |

OTHER PUBLICATIONS

International Search Report of PCT/JP2011/078413, date of mailing date Feb. 14, 2013, with Written Opinion.
Notification of Transmittal of Translation of the International Preliminary Report on Patentabililty (Form PCT/IB/338) of International Application No. PCT/JP2011/078413 mailed Jul. 4, 2013 with Forms PCT/IB/373 and PCT/ISA/237.

* cited by examiner

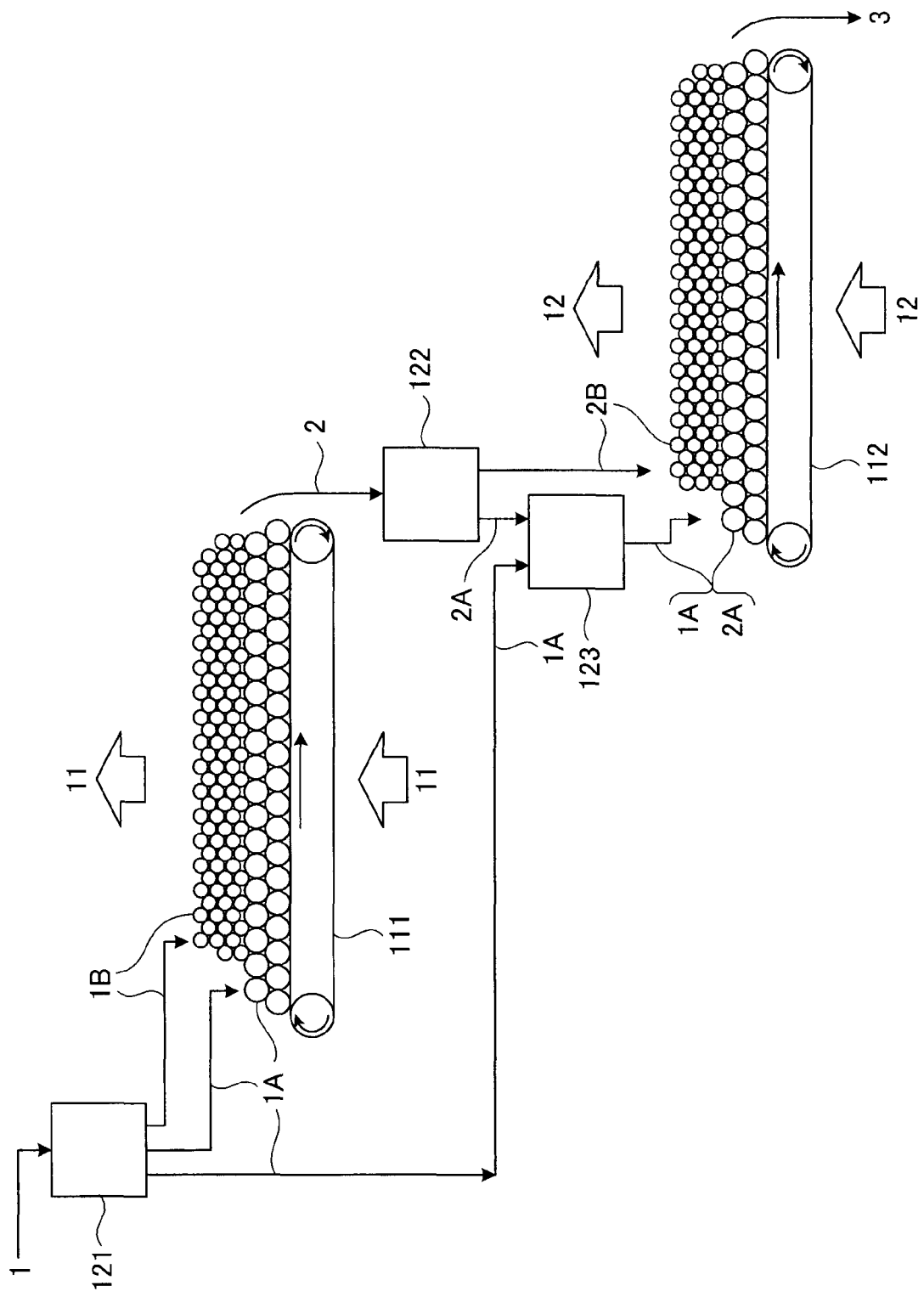

METHOD FOR GAS TREATMENT OF COAL

TECHNICAL FIELD

The present invention relates to a method for treating coal with gas.

BACKGROUND ART

Conventionally, in a case of subjecting coal to drying and dry distillation, the coal is loaded on a mesh conveyor for a drying process, hot air (about 150° C.) is supplied from below the mesh conveyor to thereabove with the mesh conveyor travelling, and moisture in the coal is thereby removed. Thereafter, the coal is dropped and thus transferred from the mesh conveyor for the drying process to a mesh conveyor for a dry distillation process, a dry-distillation heated gas (for example, combustion exhaust gas obtained by heating air through combustion) which have been heated (400° C. to 450° C.) is supplied from below the mesh conveyor to thereabove with the mesh belt conveyor for the dry distillation process travelling, and the coal is thereby subjected to dry distillation.

CITATION LIST

Patent Literature

Patent Literature 1: Japanese Unexamined Utility Model Application Publication No. Hei 5-087496

SUMMARY OF INVENTION

Technical Problem

However, in such a gas treatment of coal, when coal is broken into fine particles due to a vibration in the travelling, an impact in the transferring, and the like, the coal falls through meshes of the mesh conveyors and the yield is thereby reduced.

To counter this problem, reducing the sizes of the meshes of the mesh conveyors is conceivable. However, reduction in the sizes of the meshes of the mesh conveyors makes clogging of the meshes more likely to occur. This causes uneven flow of the gas, and uniform treatment of the coal becomes difficult.

In this respect, an object of the present invention is to provide a method for gas treatment of coal which can suppress clogging of a mesh while suppressing falling of coal from the mesh.

Solution to Problem

A method for gas treatment of coal according to a first aspect of the invention which solves the problems described above is a method for gas treatment of coal including: placing coal on a conveying body which has a quadrilateral mesh and which is configured to travel; and causing gas to flow in an up-down direction in such a way that the gas is brought into contact with the coal through the mesh of the conveying body, the method for gas treatment of coal characterized in that a lower-level loaded coal having a diameter size Dl larger than twice a length Lss of a short side of the mesh of the conveying body (Dl>2Lss) is placed on the mesh of the conveying body in at least two levels, and an upper-level loaded coal having a diameter size Du equal to or smaller than twice the length Lss (Du≤2Lss) is placed on the lower-level loaded coal.

A method for gas treatment of coal according to a second aspect of the invention is the first aspect of the invention characterized in that, when a length Lsl of a long side of the mesh of the conveying body is equal to or larger than twice the length Lss of the short side, a lower-level loaded coal having a diameter size Dl larger than 2.5 times the length Lss (Dl>2.5Lss) are used.

A method for gas treatment of coal according to a third aspect of the invention is a method for gas treatment of coal including: placing coal on a conveying body which has a triangular mesh and which is configured to travel and; causing gas to flow in an up-down direction in such a way that the gas is brought into contact with the coal through the mesh of the conveying body, the method for gas treatment of coal characterized in that a lower-level loaded coal having a diameter size Dl larger than a length Ltl of a longest side of the mesh of the conveying body (Dl>Ltl) is placed on the mesh of the conveying body in at least two levels, and an upper-level loaded coal having a diameter size Du equal to or smaller than the length Ltl (Du≤Ltl) is placed on the lower-level loaded coal.

A method for gas treatment of coal according to a fourth aspect of the invention is any one of the first to third aspects of the invention characterized in that the conveying body is a mesh conveyor, the gas is dry-distillation heated gas, the lower-level loaded coal is at least one of low-grade coal and dry coal obtained by drying the low-grade coal, and the upper-level loaded coal is the dry coal.

A method for gas treatment of coal according to a fifth aspect of the invention is any one of the first to third aspects of the invention characterized in that the conveying body is a mesh conveyor, the gas is drying heated gas, and the lower-level loaded coal and the upper-level loaded coal are low-grade coal.

Advantageous Effects of Invention

The method for gas treatment of coal of the present invention can suppress clogging of the mesh of the conveying body while suppressing falling of the coal from the mesh.

BRIEF DESCRIPTION OF DRAWING

FIG. 1 is a schematic configuration diagram of a main embodiment of a gas treatment apparatus for coal which is used to carry out a method for gas treatment of coal of the present invention.

DESCRIPTION OF EMBODIMENTS

Embodiments of a method for gas treatment of coal in the present invention are described based on the drawing. Note that present invention is not limited to the embodiment described below based on the drawings.

Main Embodiment

A main embodiment of the method for gas treatment of coal of the present invention is described based on FIG. 1.

In FIG. 1, reference numeral 111 denotes a mesh conveyor which is a conveying body of a drying device configured to perform a drying process of drying a low-grade coal 1 such as lignite and sub-bituminous coal. The mesh conveyor 111 has a quadrilateral mesh and is configured such that a drying heated gas (for example, air heated to about 150° C.) 11 for drying the low-grade coal 1 flows through the mesh conveyor 111 from below to above.

In FIG. 1, reference numeral 112 denotes a mesh conveyor which is a conveying body of a dry distillation device configured to perform a dry distillation process of subjecting a dry coal 2 dried in the drying device to dry distillation. An upstream side of the mesh conveyor 112 in a travelling direction is located below a downstream side of the mesh conveyor 111 of the drying device in the travelling direction. The mesh conveyor 112 has a quadrilateral mesh and is configured such that a dry-distillation heated gas 12 (for example, combustion exhaust gas obtained by heating air to about 400° C. to about 450° C. through combustion) for dry distillation of the dry coal 2 flows through the mesh conveyor 112 from below to above.

In FIG. 1, reference numeral 121 denotes a coal distributing device disposed above an upstream side of the mesh conveyor 111 of the drying device in the travelling direction. The coal distributing device 121 can sort the received low-grade coal 1 into a lower-level loaded coal 1A and an upper-level loaded coal 1B, according to a diameter size, and deliver the coals to a portion above the upstream side of the mesh conveyor 111 of the drying device and to a portion above the upstream side of the mesh conveyor 112 of the dry distillation device in the travelling direction.

To be specific, the coal distributing device 121 can: first sort the received low-grade coal 1 into the lower-level loaded coal 1A having a diameter size Dl larger than twice the length Lss of each of short sides of the meshes in the mesh conveyors 111, 112 (D1>2Lss) and the upper-level loaded coal 1B having a diameter size Du equal to or smaller than twice the length Lss (Du≤2Lss), by using a sieve or the like; then deliver the lower-level loaded coal 1A in such a way that the lower-level loaded coal 1A is placed on the upstream side of the mesh of the mesh conveyor 111 of the drying device in the travelling direction, in at least two levels (two levels in the embodiment); deliver the upper-level loaded coal 1B in such a way that the upper-level loaded coal 1B is placed on the lower-level loaded coal 1A on the upstream side of the mesh conveyor 111 in the travelling direction; and also deliver the lower-level loaded coal 1A to a coal supplying device 123 (described in detail later) disposed above the upstream side of the mesh conveyor 112 of the dry distillation device in the travelling direction.

In FIG. 1, reference numeral 122 denotes a coal distributing device 122 disposed between a portion below the downstream side of the mesh conveyor 111 of the drying device in the travelling direction and the portion above the upstream side of the mesh conveyor 112 of the dry distillation device in the travelling direction. The coal distributing device 122 can sort the dry coal 2 received from the mesh conveyor 112 of the drying device into a lower-level loaded coal 2A and an upper-level loaded coal 2B according to a diameter size and supply the coals to the portion above the upstream side of the mesh conveyor 112 of the dry distillation device and to the coal supplying device 123.

To be specific, the coal distributing device 122 can: first sort the received dry coal 2 into the lower-level loaded coal 2A having a diameter size Dl larger than twice the length Lss of the short side of the mesh of the mesh conveyor 112 (D1>2Lss) and the upper-level loaded coal 2B having a diameter size Du equal to or smaller than twice the length Lss (Du≤2Lss), by using a sieve or the like; then deliver the lower-level loaded coal 2A to the coal supplying device 123; and deliver the upper-level loaded coal 2B in such a way that the upper-level loaded coal 2B is placed on the lower-level loaded coals 1A, 2A placed on the upstream side of the mesh conveyor 112 in the travelling direction.

Furthermore, the coal supplying device 123 is disposed between a portion below the coal distributing device 122 and the portion above the upstream side of the mesh conveyor 112 of the dry distillation device in the travelling direction, and can deliver the upper-level loaded coals 1A, 2A received from the coal distributing devices 121, 122 in such a way that the lower-level loaded coals 1A, 2A are placed on the upstream side of the mesh of the mesh conveyor 112 in the travelling direction, in at least two levels (two levels in the embodiment).

Next, a description is given of gas treatment of coal which uses the gas treatment apparatus for coal of the embodiment described above.

When the low-grade coal 1 is put into the coal distributing device 121, the coal distributing device 121 sorts the low-grade coal 1 into the lower-level loaded coal 1A (about 30% to about 50%) and the upper-level loaded coal 1B (about 50% to about 70%), by using the sieve or the like. Then, the coal distributing device 121 places the lower-level loaded coal 1A on the upstream side of the mesh of the mesh conveyor 111 in the drying device in the travelling direction in such a way that lower-level loaded coal 1A is loaded in two levels, and also loads the upper-level loaded coal 1B on the lower-level loaded coal 1A loaded on the mesh conveyor 111. Moreover, the coal distributing device 121 delivers the lower-level loaded coal 1A to the coal supplying device 123.

The mesh conveyor 111 of the drying device on which the coals 1A, 1B are loaded (coal 1A: about 10% to about 20%, coal 1B: about 80% to about 90%) travels with the drying heated gas 11 supplied thereto from below to above, and thereby conveys the coals 1A, 1B while causing them to dry.

At this time, since the lower-level loaded coal 1A having a diameter size Dl larger than twice the length Lss of the short side of the mesh of the mesh conveyor 111 is placed on the mesh, the open rate of the mesh (proportion of mesh not clogged by coal) can be 80% or more. In other words, since the variation in the proportion of the clogged mesh can be smaller than plus or minus 10%, the drying heated gas 11 can flow while being evenly distributed to the coals 1A, 1B, and the coals 1A, 1B are thus dried evenly as a whole.

Moreover, since the lower-level loaded coal 1A is loaded on the mesh of the mesh conveyor 111 in two levels, a space penetrating the loaded lower-level loaded coal 1A in a vertical direction has an area in horizontal directions smaller than the size of mesh openings. Accordingly, falling of the upper-level loaded coal 1B from the mesh is drastically suppressed.

The dry coal 2 dried by the drying heated gas 11 while being conveyed by the mesh conveyor 111 of the drying device falls from the downstream side of the mesh conveyor 111 in the travelling direction and is put into the coal distributing device 122. The coal distributing device 122 sorts the dry coal 2 into the lower-level loaded coal 2A (about 10% to about 30%) and the upper-level loaded coal 2B (about 70% to about 90%), by using the sieve or the like, and the lower-level loaded coal 2A is delivered to the coal supplying device 123.

The coal supplying device 123 places the lower-level loaded coal 1A delivered from the coal distributing device 121 together with the lower-level loaded coal 2A in such a way that the lower-level loaded coals 1A, 2A are loaded in two levels on the upstream side of the mesh of the mesh conveyor 112 in the dry distillation device in the travelling direction. Subsequently, the coal distributing device 122 loads the upper-level loaded coal 2B on the lower-level loaded coals 1A, 2A loaded on the mesh conveyor 112 of the dry distillation device.

The mesh conveyor 112 of the dry distillation device on which the coals 1A, 2A, 2B are loaded (coals 1A, 2A: about 10% to about 20%, coal 2B: about 80% to about 90%) travels with the dry-distillation heated gas 12 supplied thereto from below to above, and thereby conveys the coals 1A, 2A, 2B while performing dry distillation thereof.

At this time, since the lower-level loaded coals 1A, 2A having a diameter size Dl larger than twice the length Lss of the short side of the mesh of the mesh conveyor 112 are placed on the mesh, the open rate of the mesh (proportion of mesh not clogged by coal) can be 80% or more. In other words, since the variation in the proportion of the clogged mesh can be smaller than plus or minus 10%, the dry-distillation heated gas 12 can flow while being evenly distributed to the coals 1A, 1B, 2A, and the coals 1A, 1B, 2B are thus subjected to dry distillation evenly as a whole.

Moreover, since the lower-level loaded coals 1A, 2A are loaded on the mesh of the mesh conveyor 112 in two levels, a space penetrating the loaded lower-level loaded coals 1A, 2A in the vertical direction has an area in horizontal directions smaller than the size of the mesh openings. Accordingly, falling of the upper-level loaded coal 2B from the mesh is drastically suppressed.

A dry-distillation coal 3 dried by the dry-distillation heated gas 12 while being conveyed by the mesh conveyor 112 of the dry distillation device falls from the downstream side of the mesh conveyor 112 in the travelling direction and is collected.

In summary, in the embodiment, the lower-level loaded coals 1A, 2A having a diameter size Dl larger than twice the length Lss of each of short sides of the meshes in the mesh conveyors 111, 112 having the quadrilateral meshes are loaded on the meshes in two levels, and then the upper-level loaded coals 1B, 2B having a diameter size Du equal to or smaller than twice the length Lss (Du≤2Lss) are placed on the lower-level loaded coals 1A, 2A.

Accordingly, in the embodiment, even when the coals 1B, 2B are broken into fine particles due to a vibration in travelling, an impact in transfer, and the like, the coals 1B, 2B are less likely to fall through the meshes of the mesh conveyors 111, 112 and a reduction in yield can be thereby suppressed.

In the embodiment, it is thus possible to suppress falling of the coals 1B, 2B from the meshes of the mesh conveyors 111, 112 and also suppress clogging of the mesh.

Moreover, in the mesh conveyors 111, 112, the upper-level loaded coals 1B, 2B having a diameter size Du equal to or smaller than twice the length Lss (Du≤2Lss) are placed on the lower-level loaded coals 1A, 2A having a diameter size Dl larger than twice the length Lss. Hence, in the heat treatment of supplying the heated gases 11, 12 from below the mesh conveyors 111, 112, the heat treatment is performed by firstly bringing the heated gases 11, 12 into contact with the lower-level loaded coals 1A, 2A, which require a longer time for heat to penetrate to the interior thereof than the upper-level loaded coals 1B, 2B and which have a small heat transfer area relative to the volume, and then the heat treatment is performed by bringing the heated gases 11, 12, whose temperatures have dropped, in contact with the upper-level loaded coal 1B which is more easily heated. Accordingly, coal with various particle diameters can be efficiently subjected to heat treatment.

Note that, since the low-grade coal 1 before drying is loaded on the mesh conveyor 112 of the dry distillation device as the lower-level loaded coal 1A to be subjected to dry distillation, the time of the dry distillation process is longer than the case where only the dry coal 2 having been dried is subjected to dry distillation. However, this is not a major problem because the proportion of the coal 1A in the entire coal is small (about several percent to about 10%)

Moreover, in a case where the length Lsl of each of long sides of the quadrilateral meshes in the mesh conveyors 111, 112 is larger than twice the length Lss of the short side thereof, it is highly preferable that the lower-level loaded coals 1A, 2A have a diameter D1 larger than 2.5 times the length Lss (Dl>2.5Lss). The reason for this is because the upper-level loaded coals 1B, 2B having a diameter size Du equal to or smaller than 2.5 times the length Lss are less likely to fall through the meshes of the mesh conveyors 111, 112, and the reduction in yield can be thereby further suppressed.

Other Embodiments

In the aforementioned embodiment, a description is given of the case where the mesh conveyors 111, 112 have the quadrilateral meshes. In another embodiment in which the mesh conveyors 111, 112 have triangular meshes, similar operations and effects as those in the aforementioned embodiment can be obtained by causing the coal distributing devices 121, 122 to sort received coals 1, 2 into lower-level loaded coals 1A, 2A having a diameter size Dl larger than the length Ltl of each of the longest sides of the meshes (Dl>Ltl) in the mesh conveyors 111, 112 and upper-level loaded coals 1B, 2B having a diameter size Du equal to or smaller than the length Ltl (Du≤Ltl).

Moreover, in the aforementioned embodiment, both of the lower-level loaded coal 1A of the low-grade coal 1 before drying and the lower-level loaded coal 2A of the dry coal 2 having been dried are mixedly placed on the mesh of the mesh conveyor 112 of the dry distillation device. However, in another embodiment, only one of the lower-level loaded coal 1A of the low-grade coal 1 before drying and the lower-level loaded coal 2A of the dry coal 2 having been dried can be placed on the mesh of the mesh conveyor 112 of the dry distillation device.

When only the lower-level loaded coal 1A of the low-grade coal 1 before drying is placed on the mesh of the mesh conveyor 112 of the dry distillation device, the coal distributing device 122 is omitted and all of the dry coal 2 from the mesh conveyor 111 of the drying device is placed on the lower-level loaded coal 1A. When only the lower-level loaded coal 2A of the dry coal 2 having been dried is placed on the mesh of the mesh conveyor 112 of the dry distillation device, the delivery of the lower-level loaded coal 1A from the coal distributing device 121 to the coal supplying device 123 is eliminated while the coal supplying device 123 is omitted, and the lower-level loaded coal 2A is placed on the mesh of the mesh conveyor 112 from the coal distributing device 122.

Furthermore, in the aforementioned embodiment, a description is given of the case where the low-grade coal 1 and the dry coal 2 thereof are placed on the mesh conveyors 111, 112 and are subjected to drying and dry distillation by causing the heated gases 11, 12 to flow in the up-down direction in such a way that the heated gases 11, 12 are brought into contact with the coals 1, 2 through the meshes. However, the present invention is not limited to this. Operations and effects similar to those in the aforementioned embodiment can be achieved by any gas treatment of coal including: placing coal on a conveying body which has a mesh with a triangular shape, a quadrilateral shape, or the like and which is configured to travel; and causing gas to flow in the up-down direction in such a way that the gas is brought into contact with the coal through the mesh of the conveying body.

INDUSTRIAL APPLICABILITY

The method for gas treatment of coal in the present invention can suppress clogging of the mesh of the conveying body while suppressing fall of coal from the mesh. Accordingly, the method can be highly effectively used in industries.

REFERENCE SIGNS LIST

1 LOW-GRADE COAL
1A LOWER-LEVEL LOADED COAL
1B UPPER-LEVEL LOADED COAL
2 DRY COAL
2A LOWER-LEVEL LOADED COAL
2B UPPER-LEVEL LOADED COAL
3 DRY-DISTILLATION COAL
11 DRYING HEATED GAS
12 DRY-DISTILLATION HEATED GAS
111, 112 MESH CONVEYOR
121, 122 COAL DISTRIBUTING DEVICE
123 COAL SUPPLYING DEVICE

The invention claimed is:

1. A method for gas treatment of coal, comprising: placing coal on a conveying body which has a quadrilateral mesh and which is configured to travel; and causing gas to flow in an up-down direction in such a way that the gas is brought into contact with the coal through the mesh of the conveying body, wherein
a lower-level loaded coal having a diameter size $Dl$ larger than twice a length $Lss$ of a short side of the mesh of the conveying body ($Dl>2Lss$) is placed on the mesh of the conveying body in at least two levels, and an upper-level loaded coal having a diameter size $Du$ equal to or smaller than twice the length $Lss$ ($Du \leq 2Lss$) is placed on the lower-level loaded coal.

2. The method for gas treatment of coal according to claim 1, wherein, when a length $Lsl$ of a long side of the mesh of the conveying body is equal to or larger than twice the length $Lss$ of the short side, a lower-level loaded coal having a diameter size $Dl$ larger than 2.5 times the length $Lss$ ($Dl>2.5Lss$) are used.

3. A method for gas treatment of coal, comprising: placing coal on a conveying body which has a triangular mesh and which is configured to travel; and causing gas to flow in an up-down direction in such a way that the gas is brought into contact with the coal through the mesh of the conveying body, wherein
a lower-level loaded coal having a diameter size $Dl$ larger than a length $Ltl$ of a longest side of the mesh of the conveying body ($Dl>Ltl$) is placed on the mesh of the conveying body in at least two levels, and an upper-level loaded coal having a diameter size $Du$ equal to or smaller than the length $Ltl$ ($Du \leq Ltl$) is placed on the lower-level loaded coal.

4. The method for gas treatment of coal according to claim 1, wherein
the conveying body is a mesh conveyor,
the gas is a dry-distillation heated gas,
the lower-level loaded coal is at least one of a low-grade coal and a dry coal obtained by drying the low-grade coal, and
the upper-level loaded coal is the dry coal.

5. The method for gas treatment of coal according to claim 1, wherein
the conveying body is a mesh conveyor,
the gas is a drying heated gas, and
the lower-level loaded coal and the upper-level loaded coal are a low-grade coal.

6. The method for gas treatment of coal according to claim 3, wherein
the conveying body is a mesh conveyor,
the gas is a dry-distillation heated gas,
the lower-level loaded coal is at least one of a low-grade coal and a dry coal obtained by drying the low-grade coal, and
the upper-level loaded coal is the dry coal.

7. The method for gas treatment of coal according to claim 3, wherein
the conveying body is a mesh conveyor,
the gas is a drying heated gas, and
the lower-level loaded coal and the upper-level loaded coal are a low-grade coal.

* * * * *